US011893865B2

(12) United States Patent
Cifuentes Lopez

(10) Patent No.: US 11,893,865 B2
(45) Date of Patent: Feb. 6, 2024

(54) FUNCTIONALITY TESTING EQUIPMENT FOR AUTOMATED TELLER MACHINE (ATM) CASSETTES, TESTING METHODS FOR CURTAINS, INSERTION LOCKS AND SPRINGS, AND CHECKING METHODS FOR CASSETTE SETUP AND ADHESIVE IDENTIFICATION LABELS

(71) Applicant: TECNOLOGIA BANCARIA S.A., Barueri (BR)

(72) Inventor: Edson Igor Cifuentes Lopez, São Paulo (BR)

(73) Assignee: TECNOLOGIA BANCARIA S.A., São Paulo (BR)

( * ) Notice: Subject to any disclaimer, the term of this patent is extended or adjusted under 35 U.S.C. 154(b) by 62 days.

(21) Appl. No.: 17/454,484

(22) Filed: Nov. 11, 2021

(65) Prior Publication Data

US 2022/0148390 A1 May 12, 2022

(30) Foreign Application Priority Data

Nov. 12, 2020 (BR) ........................ 102020023101-4

(51) Int. Cl.
*G07F 19/00* (2006.01)

(52) U.S. Cl.
CPC .......... *G07F 19/209* (2013.01); *G07F 19/201* (2013.01); *G07F 19/205* (2013.01)

(58) Field of Classification Search
CPC ...... G07F 19/20; G07F 19/201; G07F 19/205; G07F 19/209
See application file for complete search history.

(56) References Cited

FOREIGN PATENT DOCUMENTS

| | | | | | |
|---|---|---|---|---|---|
| DE | 102009032023 | A1 * | 1/2011 | ............. | G07F 19/20 |
| JP | 6385565 | B2 * | 9/2018 | ............... | G07D 9/00 |
| WO | WO-2016157999 | A1 * | 10/2016 | ............... | G07D 9/00 |

* cited by examiner

*Primary Examiner* — Laura A Gudorf
(74) *Attorney, Agent, or Firm* — JCIP; Joseph G. Chu; Jeremy I. Maynard

(57) ABSTRACT

This invention features a product preferably intended for use on the self-service and safekeeping markets. It refers to a device that enables testing and checking the strength of springs (21), condition and functioning of the curtain (17), the insertion lock (19), visual identification and setup of the cassettes (6), all done automatically and sequentially for a cassette 6 of a banking Automated Teller Machine (ATM). The equipment includes sensors for measurement of springs (21), a camera (20) and a 7" display/screen (5) for viewing the curtain (17), menu viewing display and a touchscreen (2) for easier operation.

6 Claims, 13 Drawing Sheets

SECTION C-C
SCALE 1:5

FUNCTIONALITY TESTING EQUIPMENT FOR AUTOMATED TELLER MACHINE (ATM) CASSETTES, TESTING METHODS FOR CURTAINS, INSERTION LOCKS AND SPRINGS, AND CHECKING METHODS FOR CASSETTE SETUP AND ADHESIVE IDENTIFICATION LABELS

FIELD OF THE INVENTION

This specification describes an invention patent application of a Functionality Testing Device for banking Automated Teller Machine (ATM) Cassettes.

STATE OF THE ART

Currently there is no equipment that helps the user to automatically identify and measure the main and potential causes for issues in cassettes for use in banking Automated Teller Machines.

Cassettes are money bill reservoirs, required for ATMs, including devices that work in conjunction with the equipment systems, and such systems are required for mechanical functionalities such as, for example, bill storage and release, as well as electronic functionalities, such as quantity control of output of money bills and bill validation.

Cassettes have inputs showing wear after a single use flow, and the main inputs are: "Curtain" (malleable plastic piece responsible for closing the front cassette part), the "insertion lock" (piece that maintains the cassette locked in place for ATM operation), "springs", "setting pins" (that confirm the configuration which the cassette is defined and which bills are being used) and an adhesive information label (a quick reference for the type of bill fed into the cassette and the position to be inserted in the ATM).

ISSUES WITH THE STATE OF THE ART

Currently the cassette functionality test is carried out manually, which may feature a process inaccuracy. Due to the flow of use, cassette inputs are worn out, and a technical check is required for replacement.

OBJECTIVES OF THE INVENTION

For standardization and automation of the functionality test, the cassette tester proposed herein was developed, which aims at checking items: curtain, insertion lock, springs, configuration pins and informative adhesive labels, generating a report at the end with results from all tests, describing the cassette condition.

ADVANTAGES OF THE INVENTION REGARDING THE STATE OF THE ART

The Cassette Tester carries out testing automatically, not reliant on operator skill in performing tests and with no interference of a possible subjective analysis of the operator.

At the end of tests, a report is generated with results from all tests, describing the cassette conditions.

BRIEF DESCRIPTION OF THE DRAWINGS

In order to complement this description for a better understanding of the equipment characteristics proposed herein and according to a preferred practical embodiment of the aforementioned invention, a set of drawings follows the attached description, which in an exemplified manner, although not limiting, is represented as follows.

DETAILED DESCRIPTION OF THE INVENTION

Figure 1:
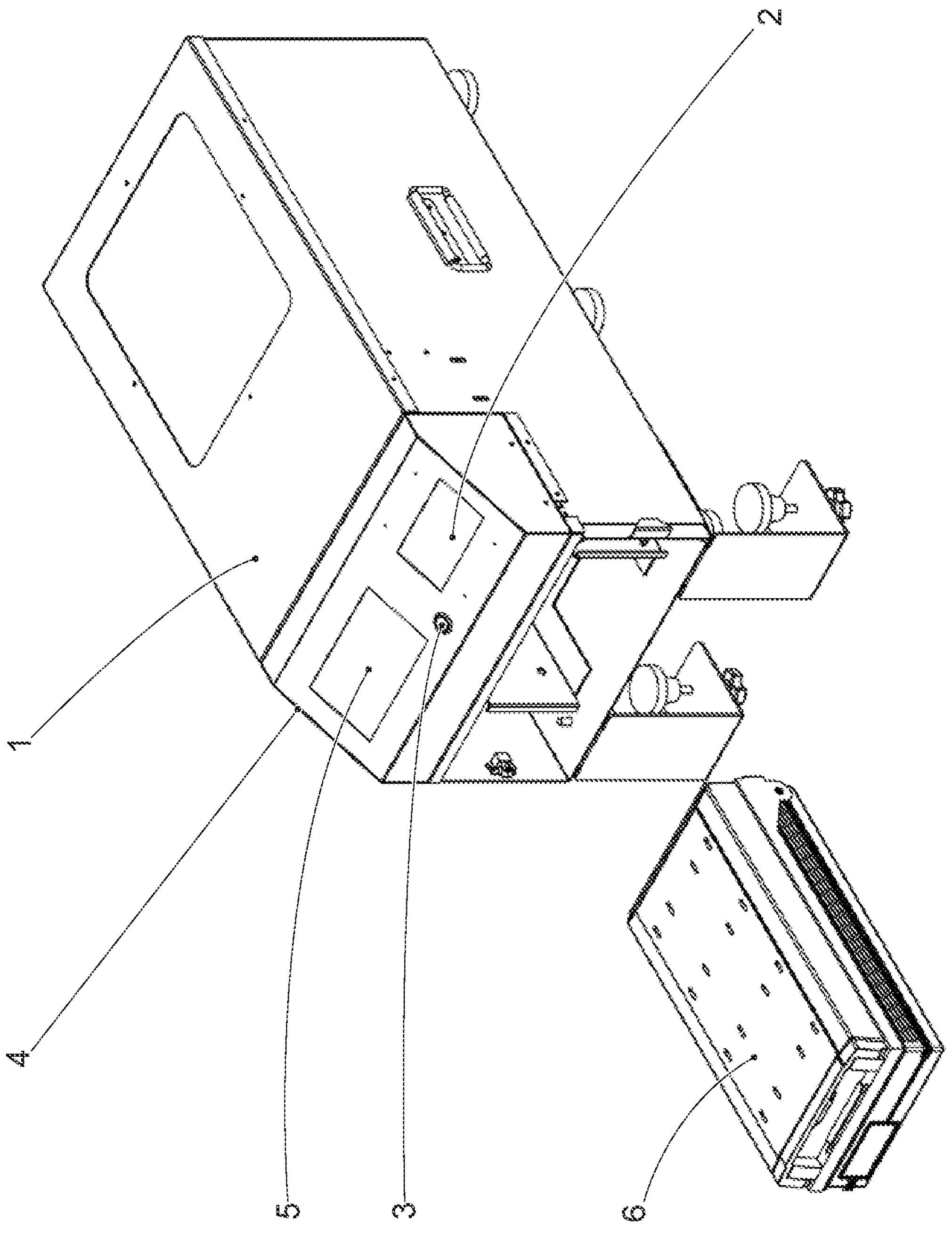
FIG. 1 shows a perspective front view of the cassette tester.
Figure 2:
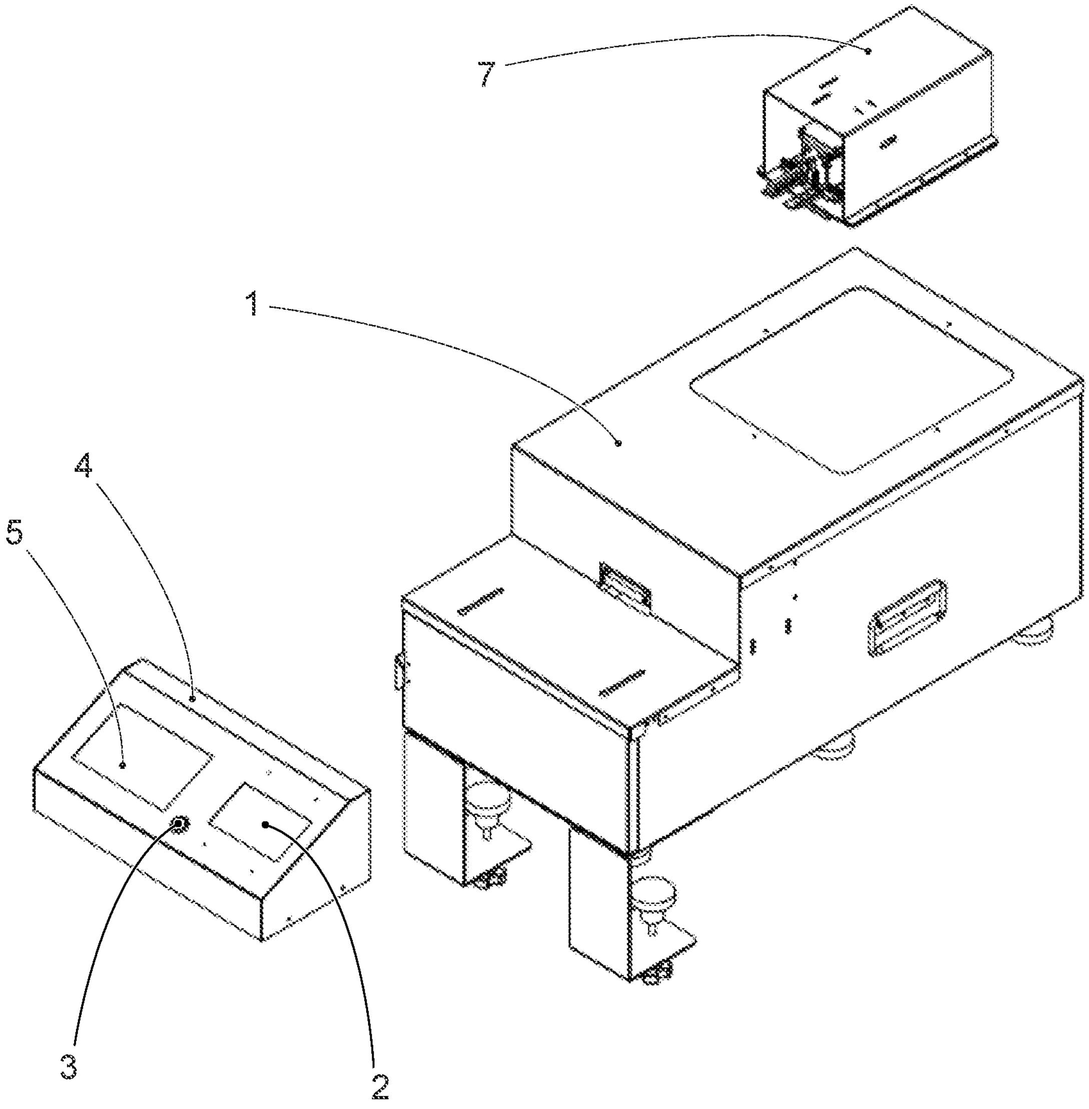
FIG. 2 shows the modules of the cassette tester.
Figure 3:
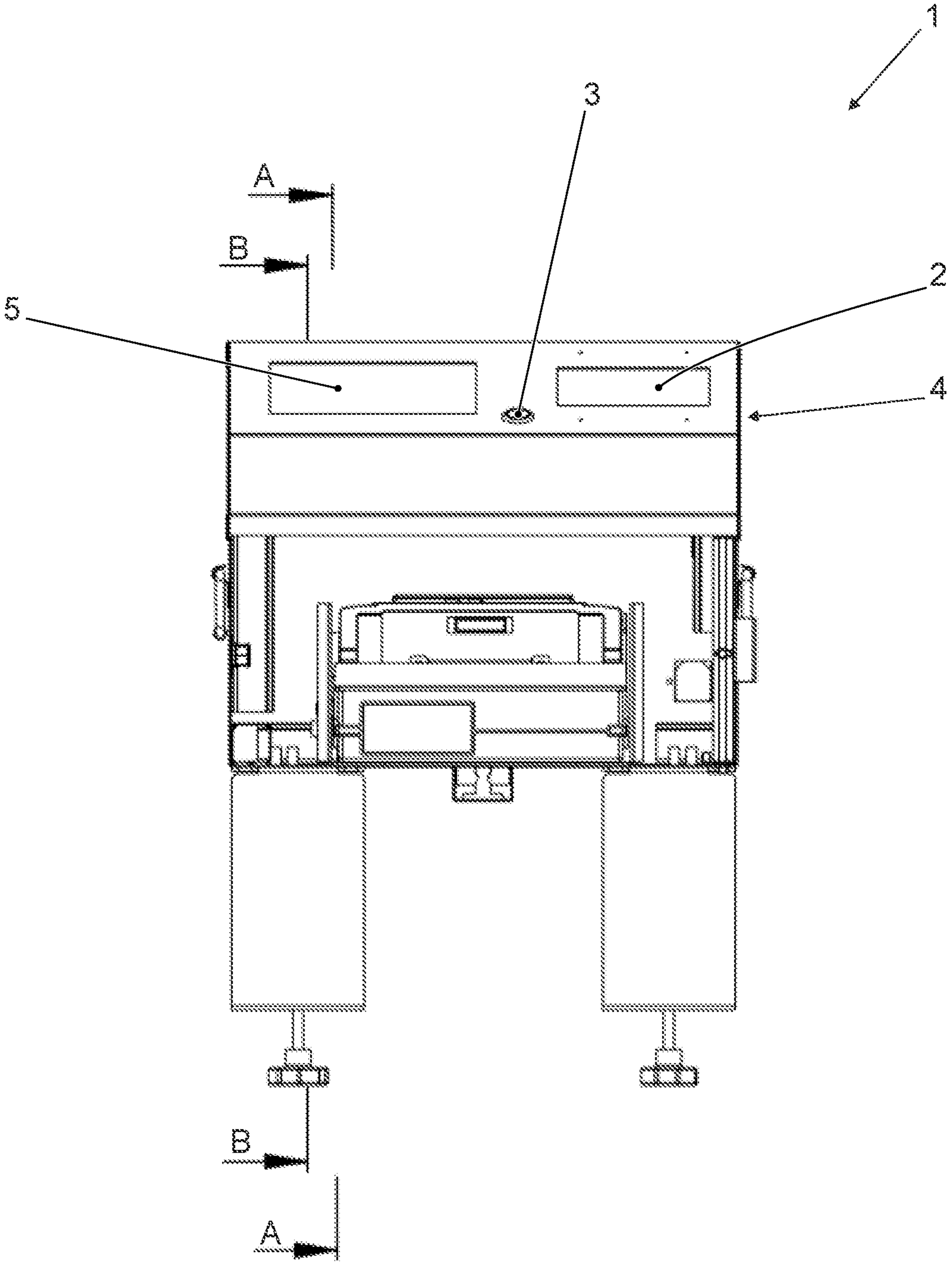
FIG. 3 shows a front view of the cassette tester.
Figure 4:
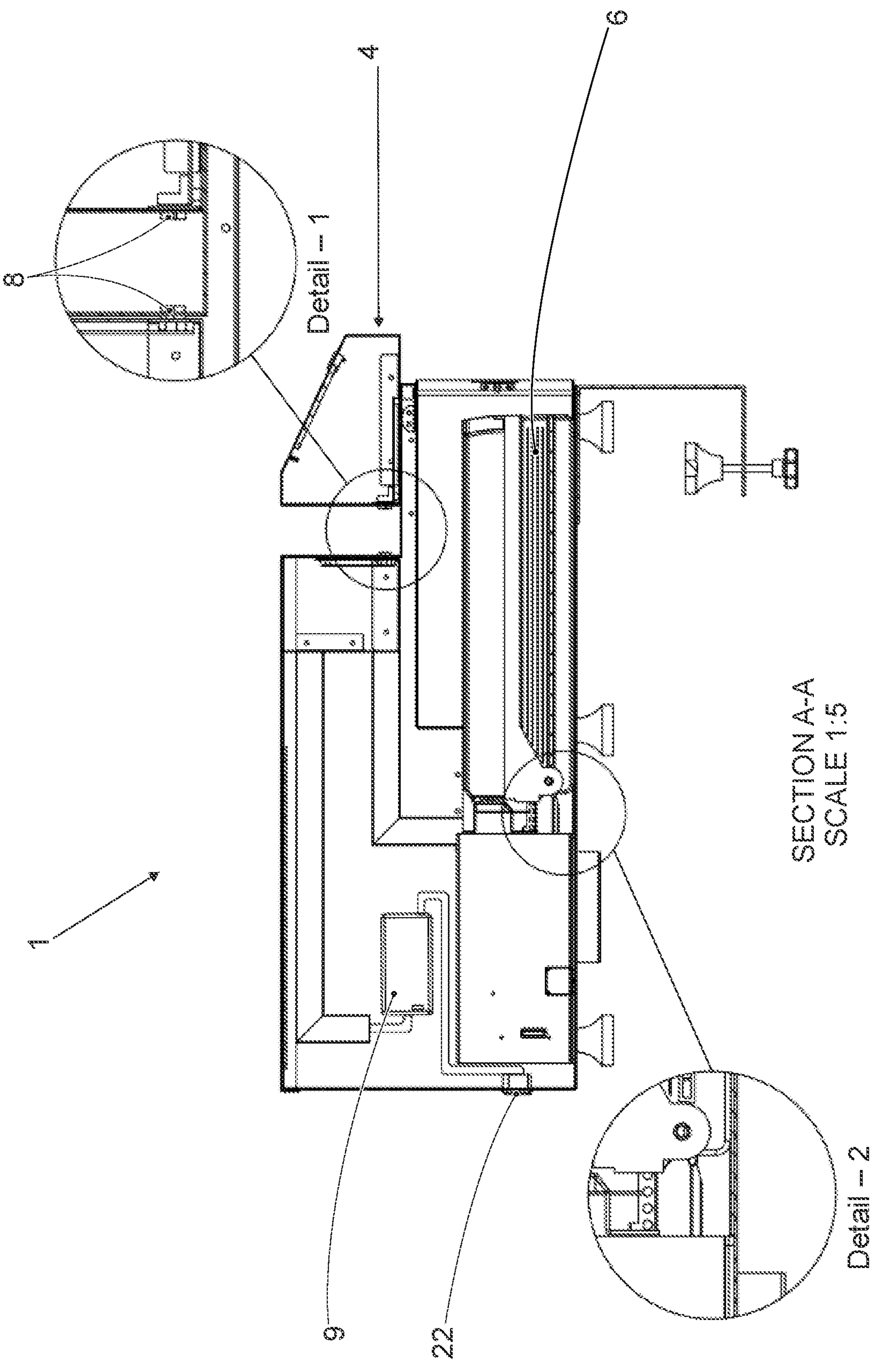
FIG. 4 shows a cross-sectional view A-A shown in FIG. 3.
Figure 5:
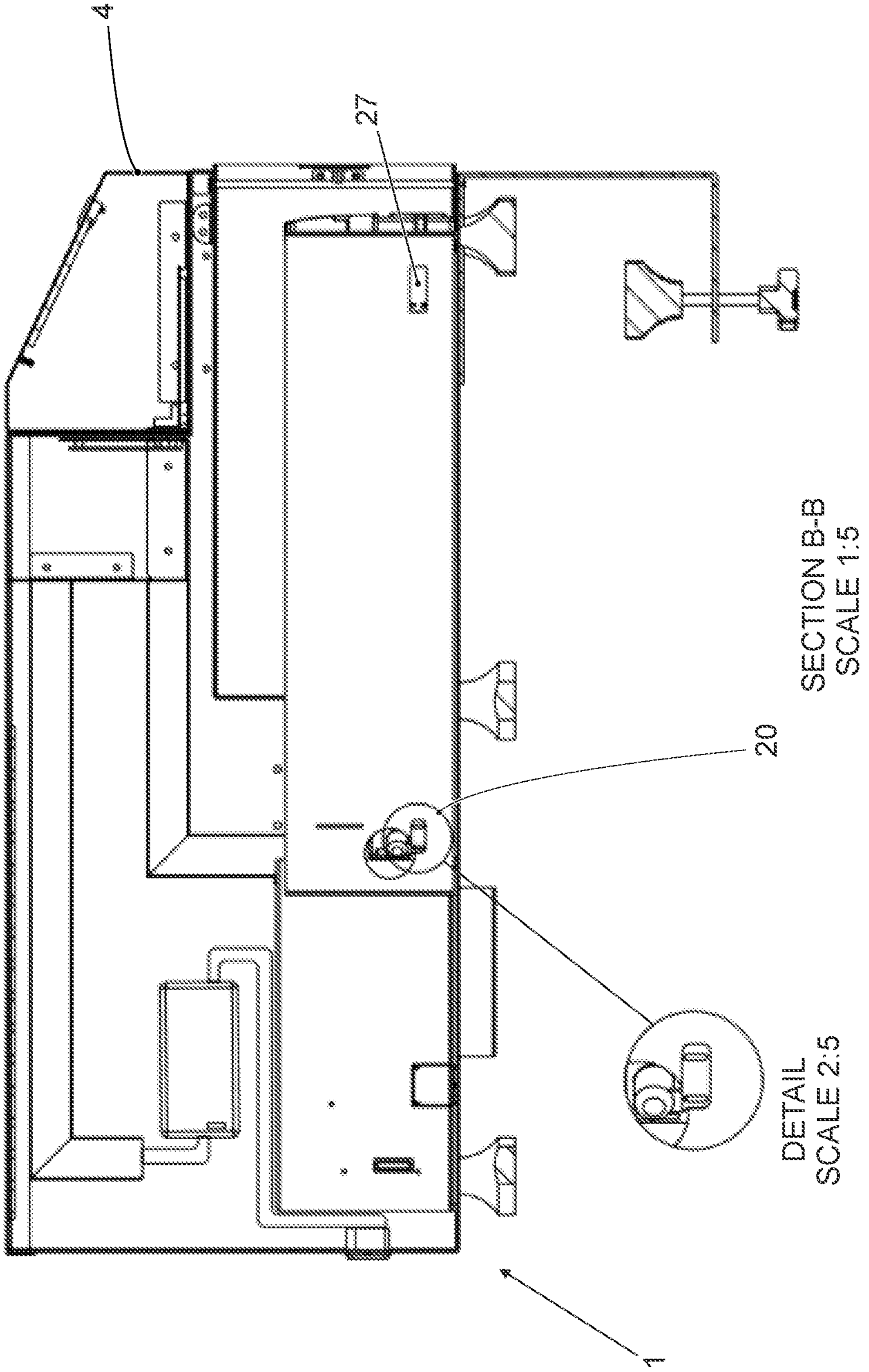
FIG. 5 shows a cross-sectional view B-B shown in FIG. 3.
Figure 6:
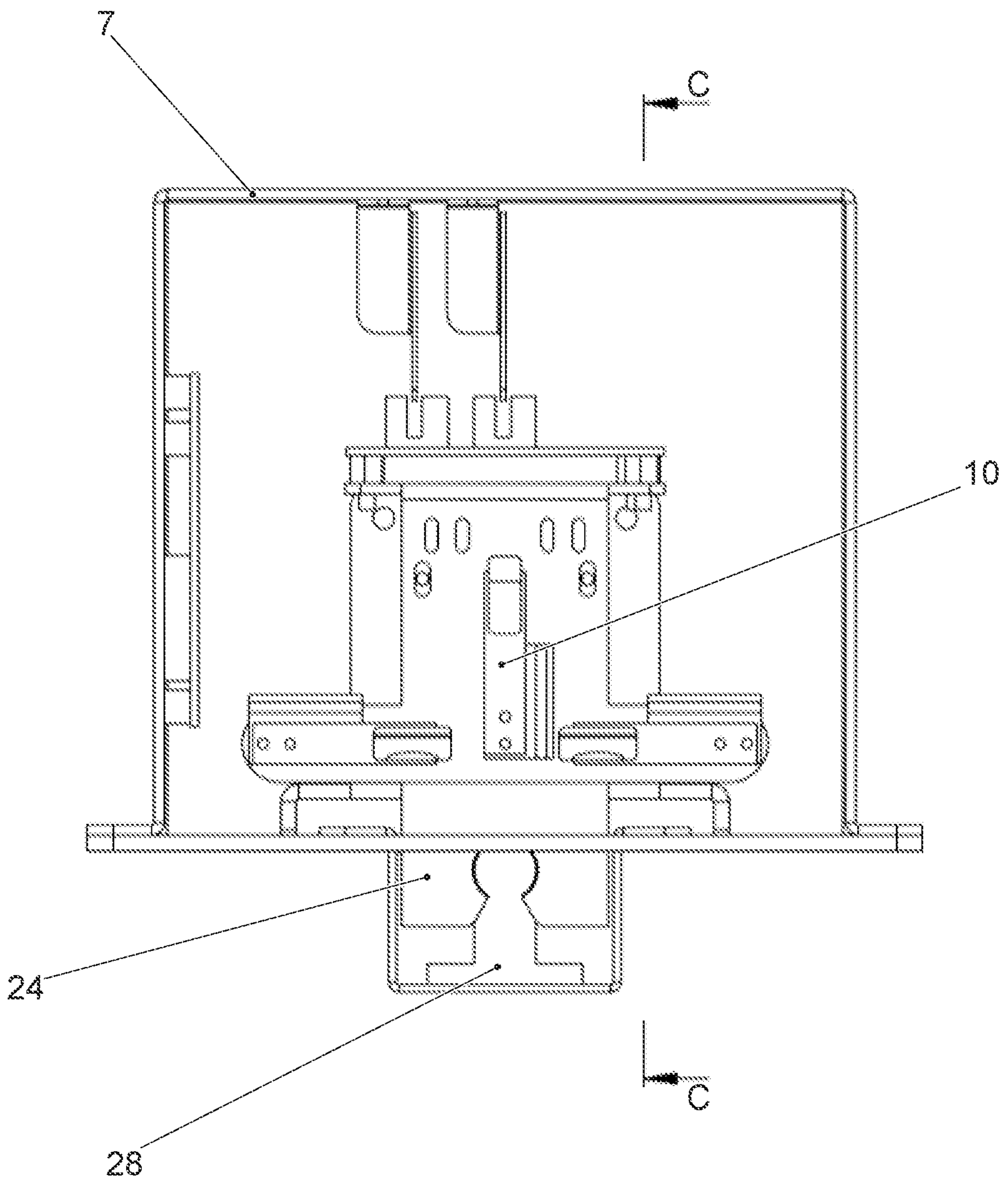
FIG. 6 shows a front view of the sensor module.
Figure 7:
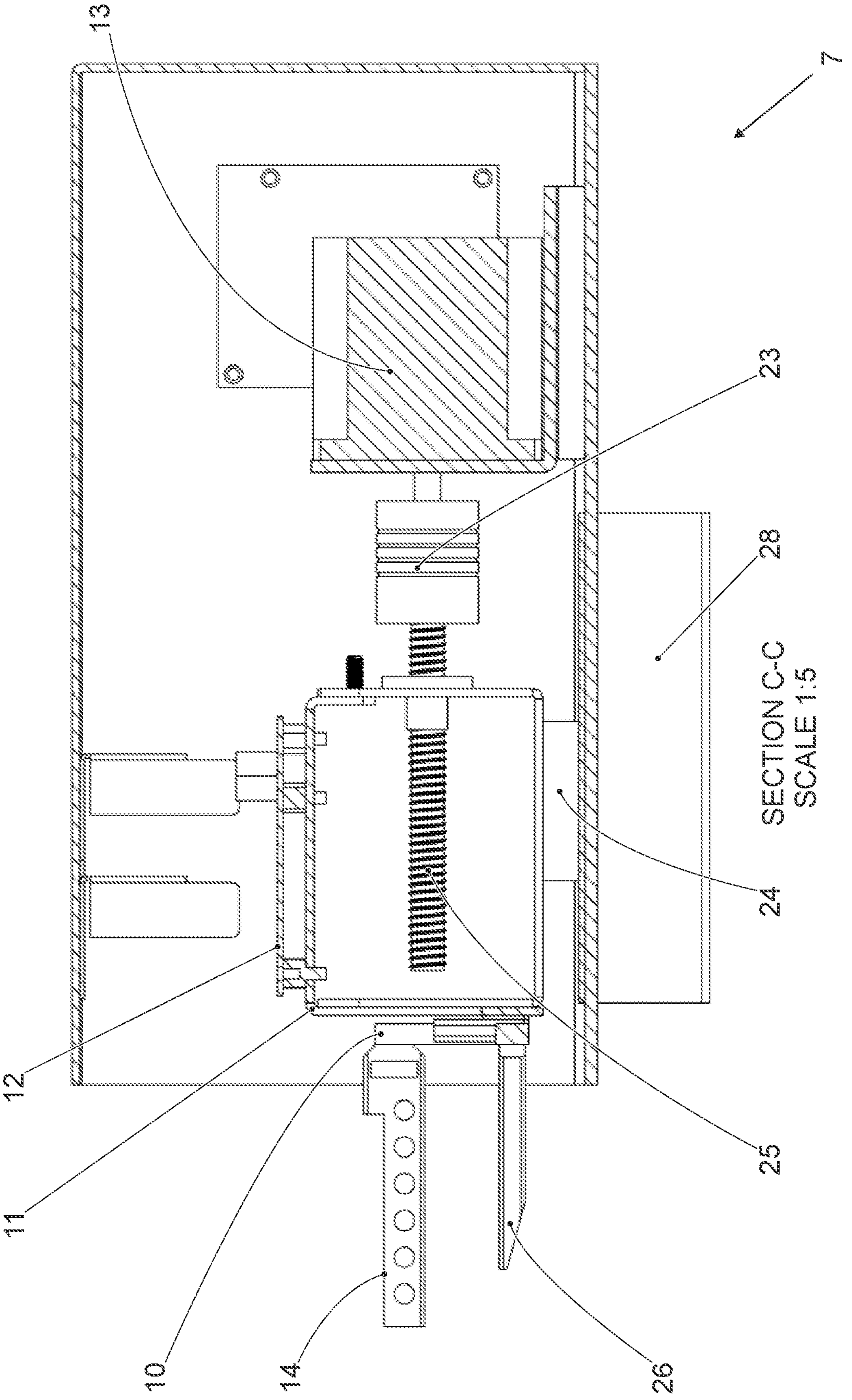
FIG. 7 shows a cross-sectional view C-C shown in FIG. 6.
Figure 8:
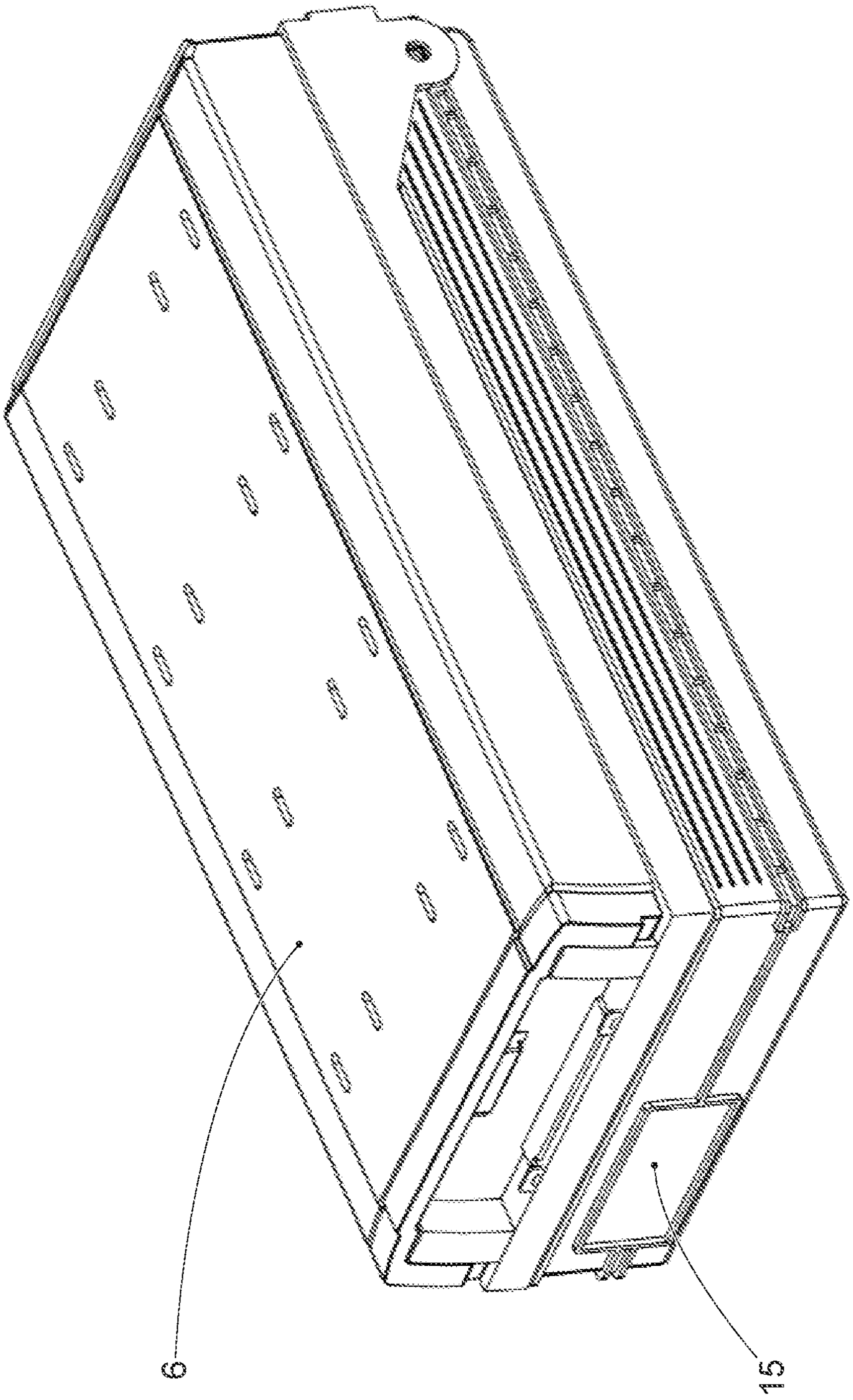
FIG. 8 shows a perspective view of the cassette.
Figure 9:
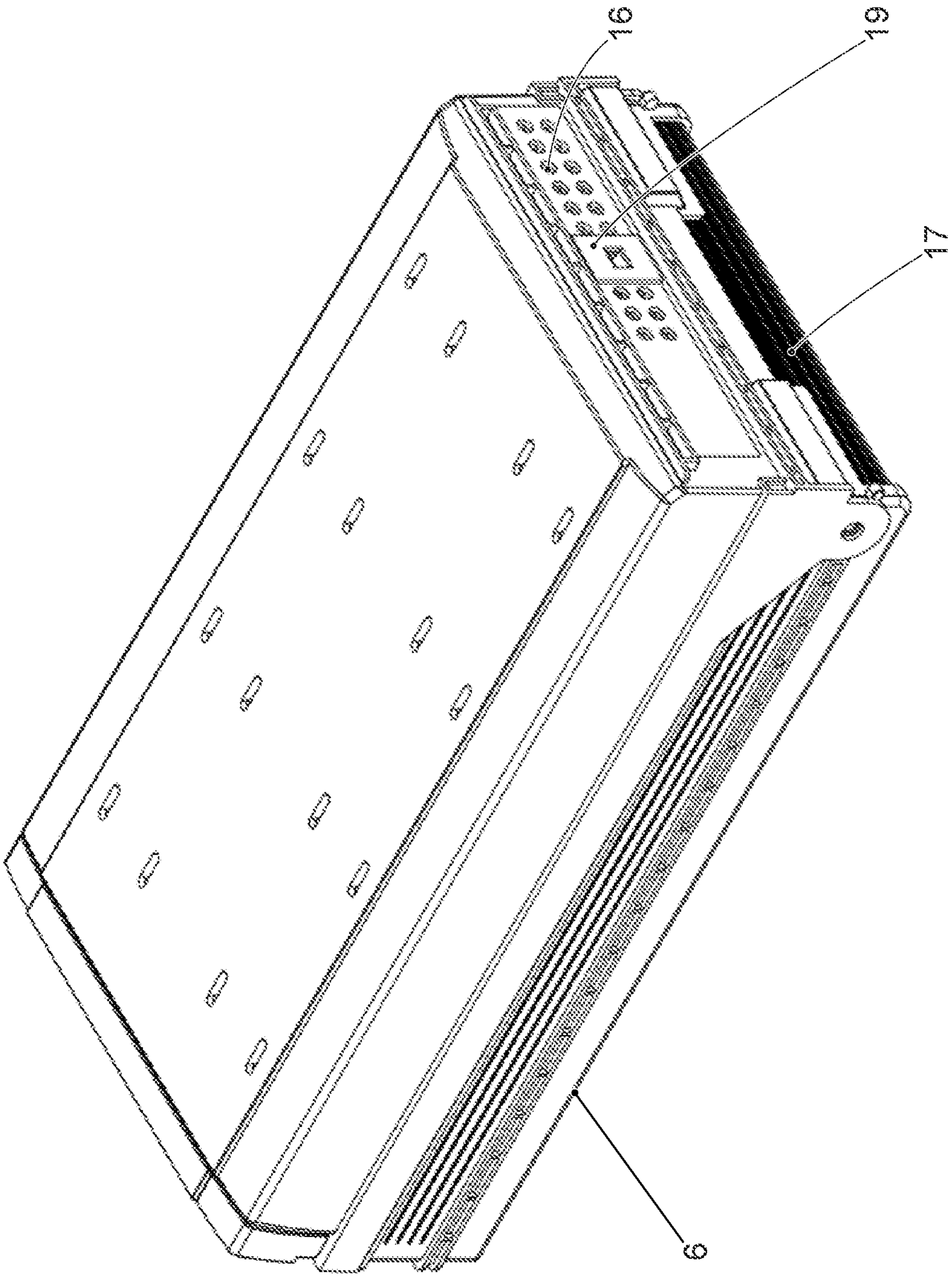
FIG. 9 shows a forward perspective view of the cassette.
Figure 10:
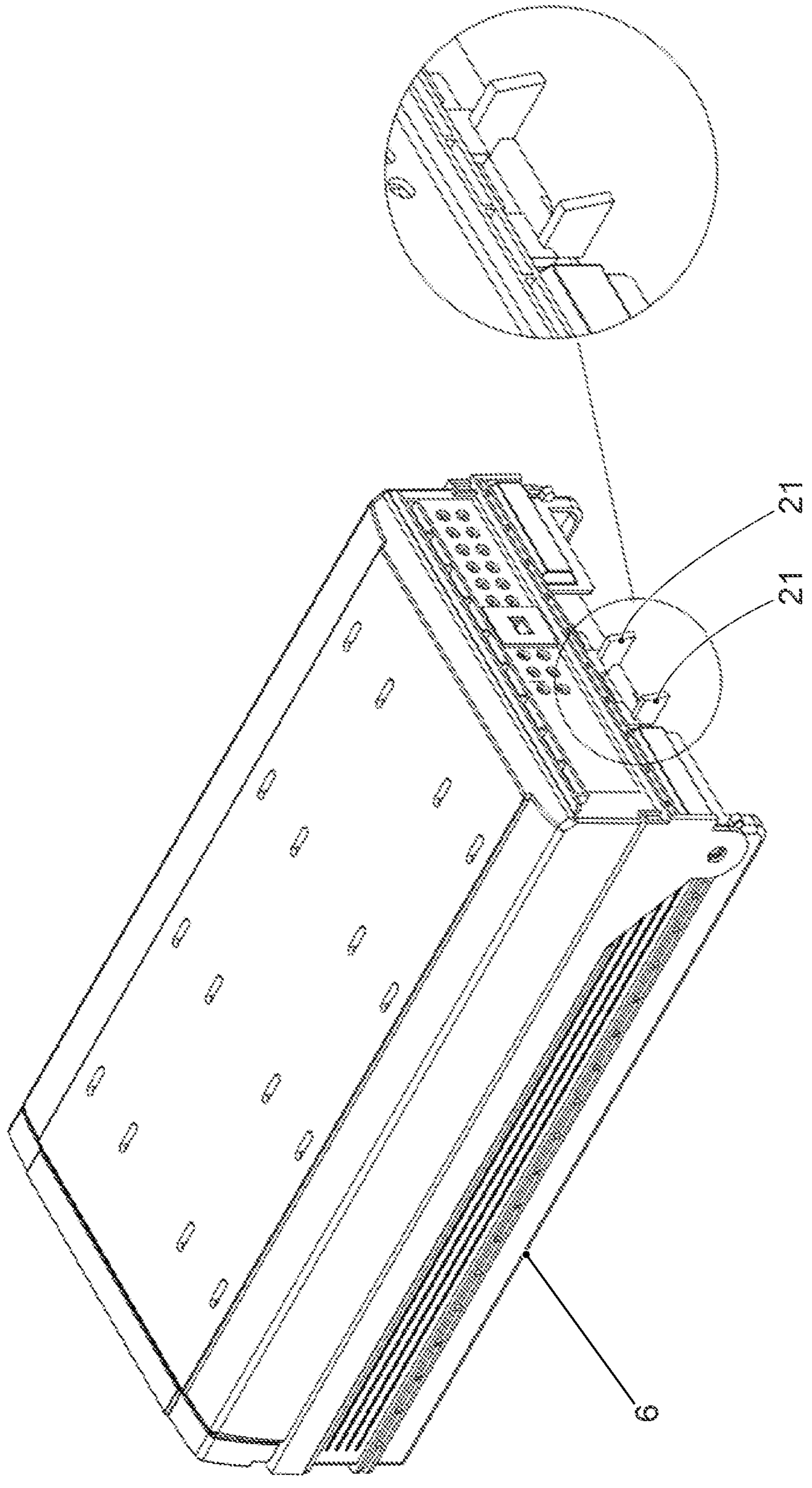
FIG. 10 shows the forward view of the cassette, portraying additional details of the cassette springs.
Figure 11:
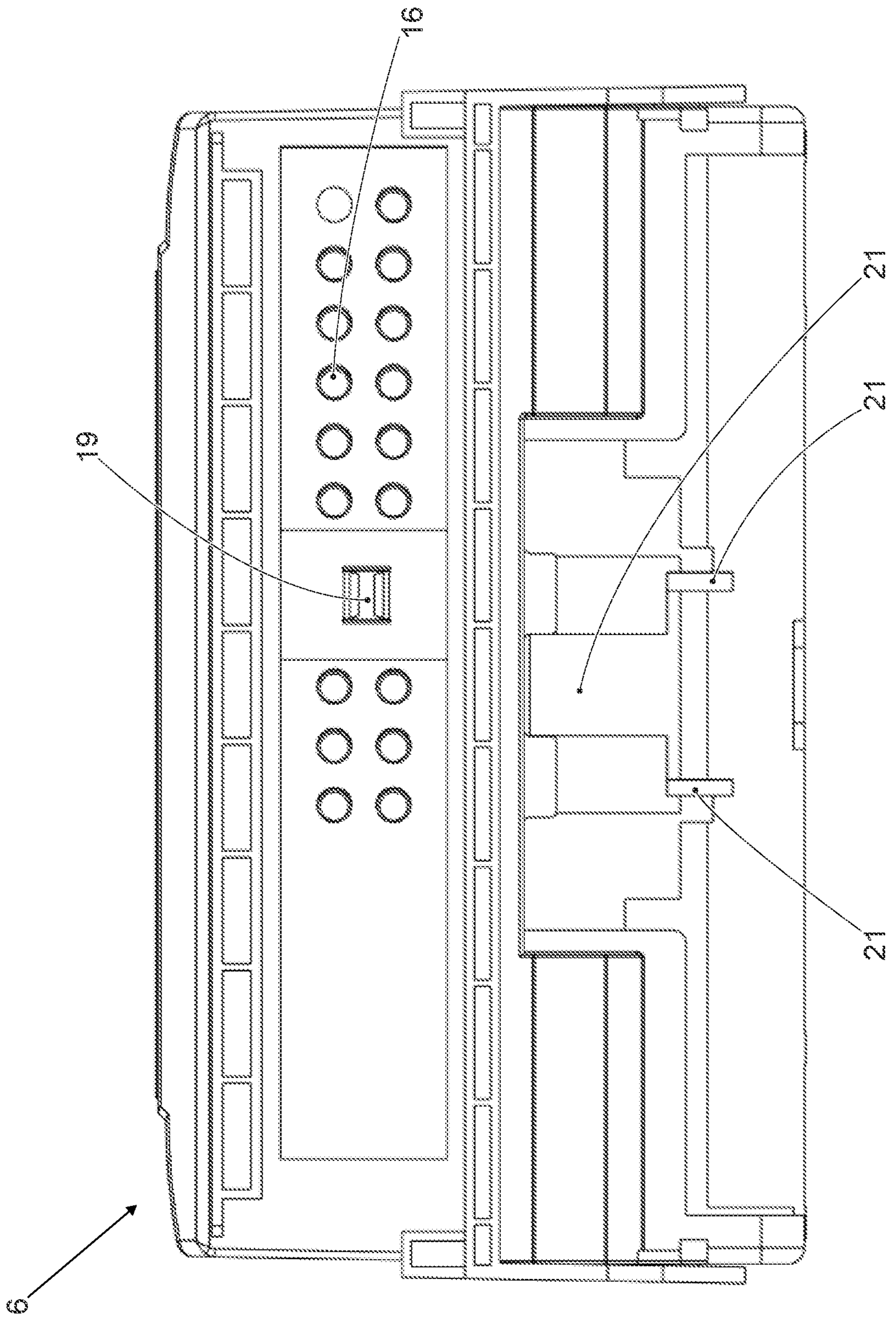
FIG. 11 shows the forward view of the cassette, portraying additional details of the setup buttons.
Figure 12:
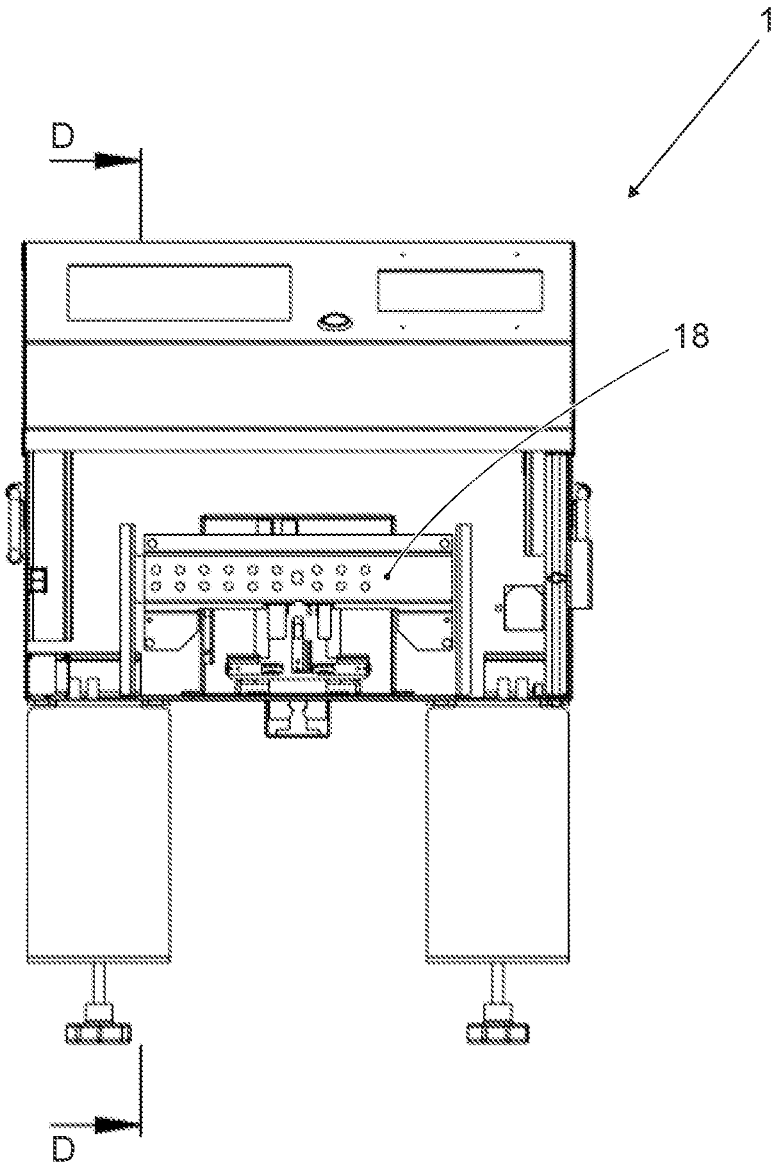
FIG. 12 shows a front view of the cassette tester with no cassettes.
Figure 13:
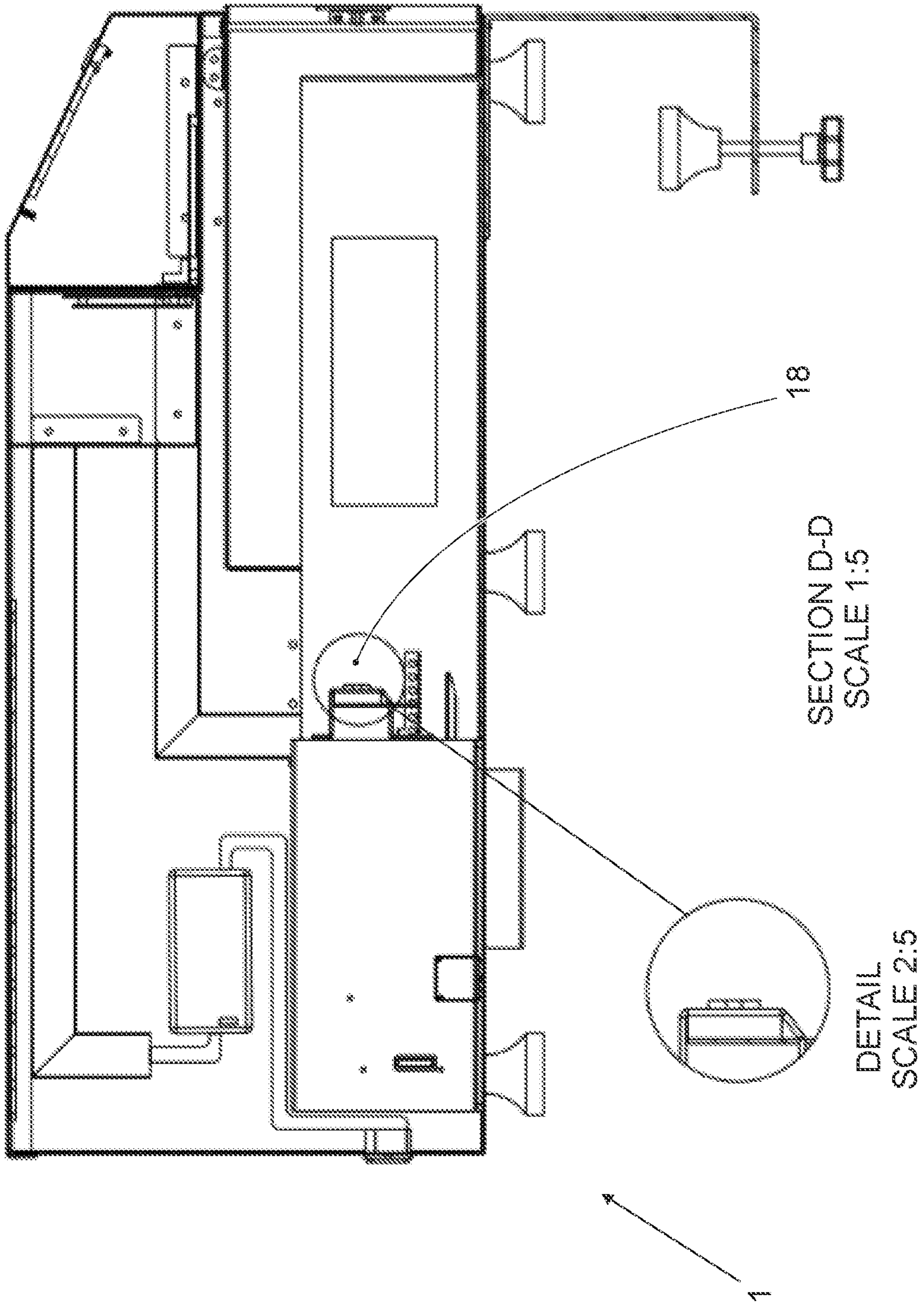
FIG. 13 shows a cross-sectional view D-D shown in FIG. 12.

The Cassette Tester represented by the isometric view in FIG. 1 was developed for installation on a fixed surface, and to facilitate maintenance of the cassette tester in case of faults or defects, it was split in 3 parts (FIG. 2) namely: cabinet 1, sensor module 7, multimedia 4.

The cabinet 1 is the structural part, responsible for integrating the sensor module 7 and multimedia 4; and lodge the cassette 6 during the test. The cabinet 1 is also responsible for powering the parts, sensor module 7 and multimedia 4, through an electric power source 9 fixed internally, fed through an AC outlet 22.

The sensor module 7 is a device developed to measure the strength of the springs 21, mainly comprising: an electronic board 12, step motor 13, worm shaft 25, among which is placed a coupling 23 which connects the step motor 13 to the worm shaft 25, bearing 24, shaft 28, mechanical structure 11, load cell 10, upper aluminum rod 14 and lower aluminum rod 26 for transferring forces between the load cell 10 and springs 21 of the cassette 6, the measurement takes place when a command from the electronic board 12 is sent to the step motor 13 which moves the mechanical structure 11 towards the springs 21 of the cassette 6 through bearing 24 which slides on the shaft 28 used as a rail, and using load cells 10 which, by means of contact with the springs 21, are pressed by rods 14 and 26, which carry out the readings and inform the forces. After the measurement process is performed, a report is shown on the touchscreen 2 detailing which springs 21 were approved and rejected, in addition to the variance and value for each spring 21 in grams.

The multimedia module 4 is a steel box comprising: touchscreen 2, 7" display/screen 5, on/off button 3 and Centronics connector 8 for attachment and detachment. The multimedia module 4 has the objective of lodging all user interface components for the cassette testing device.

The tester follows a defined test cycle, and may have sequentially configurable orders and phases, and test phases for the curtain 17, insertion lock 19, springs 21, setting pins 16 and checking of adhesive identification labels 15 may be carried out, and a report is shown at the end of all test phases on the touchscreen 2 detailing all test results carried out for the cassette 6 with detailed information on the approved cassettes and the issues with the rejected ones.

For the curtain 17 test, real-time images are shown on the 7" display/screen 5 through a camera 20 placed inside the tester, in case of faults which prevent the opening of the curtain 17 and if there are fissures, broken sections and/or holes.

For the insertion lock 19 test, the operator is prompted by the touchscreen 2 to attempt removal of the cassette 6 which is locked in position inside the tester, and optical sensors 27 are able to detect if such movement is performed or not, thus proving the effectiveness, or lack thereof, of the insertion lock 19.

For the spring 21 test, the sensor module 7, via the load cells 10, measures the forces of springs 21 of the cassette 6, and the electronic board 12 reads data from the load cells 10 and transfers all details to the touchscreen 2, informing which springs 21 were approved or rejected, as well as the values found and variances between measurements.

For the cassette setup 6 test, the cassette 6 is checked for configuration to the suitable type of bill; as there are different sizes and names for money bills, the cassette 6 must be checked according to the type of bill to be used. This configuration is defined through setting pins 16 placed on the front section of the cassette 6, and through mechanical contact reading of said setting pins 16 with an electronic contact board 18, the type of bill to be used is checked for compatibility with the configuration of detected setting pins 16 by comparison with an internal database.

For the adhesive identification label checking 15 test, the operator is prompted to visually compare the type of label informed on the touchscreen 2 with the adhesive identification label 15 attached to the cassette 6. In this case, the operator must inform, via the touchscreen 2, if information is matching or not, thus generating the respective approved or rejected results.

At the end of the test, the tester shows a detailed report via the touchscreen including all information of the items tested from the cassette 6.

This patent refers to a functionality testing equipment for Automated Teller Machine (ATM) cassettes, which is preferably intended for use on the self-service and safekeeping markets, in the form of a device that enables testing and checking the strength of springs 21, condition and functioning of the curtain 17, the insertion lock 19, and visual identification and setup of the cassettes 6, all done automatically and sequentially for a cassette 6 of a banking Automated Teller Machine (ATM). For such purposes, the tester includes sensors for measurement of springs 21, a camera 20 and a curtain visualization screen 17, menu viewing display and a touchscreen 2 for easier operation.

The invention claimed is:

1. A functionality testing equipment for automated teller machine cassettes, the equipment comprising:

cabinet (1), sensor module (7) and multimedia module (4);

wherein the cabinet (1) is part of the sensor module (7) and the multimedia module (4); and wherein the cabinet houses a cassette (6) during a test and provides electric power to components, sensor module (7) and multimedia module (4), through an internally fixed electric power source (9), fed by an AC outlet (22);

wherein the sensor module (7) comprises an electronic board (12), a step motor (13), worm shaft (25) between which there is an attachment (23), bearing (24), shaft (28), mechanical structure (11), load cell (10), upper aluminum rod (14) and lower aluminum rod (26); load cell (10) through the bearing (24) that slides on the shaft (28) used as a rail and employing load cells (10) which, through contact with springs (21) on the cassette are pressed by the rods (14) and (26); and, wherein the multimedia module (4) is a steel box comprising: touchscreen (2), 7" display (5), on/off button (3) and Centronics connector (8).

2. A method for curtain testing carried out by testing equipment having a cabinet (1), sensor module (7) and multimedia module (4);

wherein the cabinet (1) is part of the sensor module (7) and the multimedia module (4) and wherein the cabinet houses a cassette (6) during a test and provides electric power to components, sensor module (7) and multimedia module (4), through an internally fixed electric power source (9), fed by an AC outlet (22);

wherein the sensor module (7) comprises an electronic board (12), a step motor (13), worm shaft (25) between which there is an attachment (23), bearing (23), shaft (28), mechanical structure (11), load cell (10), upper aluminum rod (14) and lower aluminum rod (26); load cell (10) through the bearing (24) that slides on the shaft (28) used as a rail and employing load cells (10) which, through contact with springs (21) on the cassette are pressed by the rods (14) and (26);

wherein the multimedia module (4) is a steel box comprising: touchscreen (2), 7" display (5), on/off button (3) and Centronics connector (8), and wherein real-time images are shown on the 7" display, though a camera (20) placed inside the cabinet, for defects that prevent the opening of a curtain (17) on the cassette and if there are any fissures, broken parts and/or holes; at the end of the test, a detailed report is shown via the touchscreen (2) including all information of items tested from the cassette (6).

3. A method for insertion lock testing carried out by testing equipment having a cabinet (1), sensor module (7) and multimedia module (4);

wherein the cabinet (1) is part of the sensor module (7) and the multimedia module (4) and wherein the cabinet houses a cassette (6) during a test and provides electric power to components, sensor module (7) and multimedia module (4), through an internally fixed electric power source (9), fed by an AC outlet (22);

wherein the sensor module (7) comprises an electronic board (12), a step motor (13), worm shaft (25) between which there is an attachment (23), bearing (23), shaft (28), mechanical structure (11), load cell (10), upper aluminum rod (14) and lower aluminum rod (26); load cell (10) through the bearing (24) that slides on the shaft (28) used as a rail and employing load cells (10) which, through contact with springs (21) on the cassette are pressed by the rods (14) and (26);

wherein the multimedia module (4) is a steel box comprising: touchscreen (2), 7" display (5), on/off button (3) and Centronics connector (8), and wherein an operator is prompted by the touchscreen (2) to attempt removal of the cassette (6) which is locked in position inside the cabinet, and optical sensors (27) are able to detect if such movement is performed or not, thus proving the effectiveness, or lack thereof, of an insertion lock (19) on the cassette; at the end of the test, the tester shows a detailed report via the touch screen (2) including all information of items tested from the cassette (6).

4. A method for spring testing carried out by testing equipment having a cabinet (1), sensor module (7) and multimedia module (4);

wherein the cabinet (1) is part of the sensor module (7) and the multimedia module (4) and wherein the cabinet houses a cassette (6) during a test and provides electric power to components, sensor module (7) and multimedia module (4), through an internally fixed electric power source (9), fed by an AC outlet (22);

wherein the sensor module (7) comprises an electronic board (12), a step motor (13), worm shaft (25) between which there is an attachment (23), bearing (23), shaft (28), mechanical structure (11), load cell (10), upper aluminum rod (14) and lower aluminum rod (26); load cell (10) through the bearing (24) that slides on the shaft (28) used as a rail and employing load cells (10) which, through contact with springs (21) on the cassette are pressed by the rods (14) and (26);

wherein the multimedia module (4) is a steel box comprising: touchscreen (2), 7" display (5), on/off button (3) and Centronics connector (8), and wherein the sensor module (7), via the load cells (10), measures forces of the springs (21) of the cassette (6), and the electronic board (12) reads data from the load cells (10) and transfers all details to the touchscreen (2), informing which springs (21) were approved or rejected, as well as values of the spring and variances between measurements; at the end of the test, the tester shows a detailed report via the touchscreen (2) including all information of items tested from the cassette (6).

5. A method for cassette setup checking, carried out by testing equipment having a cabinet (1), sensor module (7) and multimedia module (4);

wherein the cabinet (1) is part of the sensor module (7) and the multimedia module (4) and wherein the cabinet houses a cassette (6) during a test and provides electric power to components, sensor module (7) and multimedia module (4), through an internally fixed electric power source (9), fed by an AC outlet (22);

wherein the sensor module (7) comprises an electronic board (12), a step motor (13), worm shaft (25) between which there is an attachment (23), bearing (23), shaft (28), mechanical structure (11), load cell (10), upper aluminum rod (14) and lower aluminum rod (26); load cell (10) through the bearing (24) that slides on the shaft (28) used as a rail and employing load cells (10) which, through contact with springs (21) on the cassette are pressed by the rods (14) and (26);

wherein the multimedia module (4) is a steel box comprising: touchscreen (2), 7" display (5), on/off button (3) and Centronics connector (8), and wherein the cassette (6) is checked for configuration to a suitable type of bill, through settings pins (16) placed on a front section of the cassette (6), and through mechanical contact reading of said settings pints (16) with an electronic contact board (18), the type of bill to be used is checked for compatibility with configuration of detected settings pins (16) by comparison with an internal database; at the end of the test, the tester shows a detailed report via the touchscreen (2) including all information of items tested from the cassette (6).

6. A method for adhesive label checking carried out by testing equipment having a cabinet (1), sensor module (7) and multimedia module (4);

wherein the cabinet (1) is part of the sensor module (7) and the multimedia module (4) and wherein the cabinet houses a cassette (6) during a test and provides electric power to components, sensor module (7) and multimedia module (4), through an internally fixed electric power source (9), fed by an AC outlet (22);

wherein the sensor module (7) comprises an electronic board (12), a step motor (13), worm shaft (25) between which there is an attachment (23), bearing (23), shaft (28), mechanical structure (11), load cell (10), upper aluminum rod (14) and lower aluminum rod (26); load cell (10) through the bearing (24) that slides on the shaft (28) used as a rail and employing load cells (10) which, through contact with springs (21) on the cassette are pressed by the rods (14) and (26);

wherein the multimedia module (4) is a steel box comprising: touchscreen (2), 7" display (5), on/off button (3) and Centronics connector (8), and wherein an operator is prompted to visually compare type of label informed on the touchscreen (2) with an adhesive identification label (15) attached to the cassette (6)I the operator then informs via the touchscreen (2) if information is matching or not, thus generating approved or rejected results; at the end of the test, the tester shows a detailed report via the touchscreen (2) including all information of items tested from the cassette (6).

* * * * *